United States Patent
Katsumata

(10) Patent No.: US 8,612,120 B2
(45) Date of Patent: Dec. 17, 2013

(54) CONTROL APPARATUS FOR INTERNAL COMBUSTION ENGINE

(75) Inventor: Machiko Katsumata, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 556 days.

(21) Appl. No.: 13/000,041

(22) PCT Filed: Nov. 4, 2009

(86) PCT No.: PCT/JP2009/068841
§ 371 (c)(1),
(2), (4) Date: Dec. 20, 2010

(87) PCT Pub. No.: WO2011/055431
PCT Pub. Date: May 12, 2011

(65) Prior Publication Data
US 2011/0144892 A1 Jun. 16, 2011

(51) Int. Cl.
  B60T 7/12 (2006.01)
  G05D 1/00 (2006.01)
  G06F 7/00 (2006.01)
  G06F 17/00 (2006.01)
  F01L 1/34 (2006.01)

(52) U.S. Cl.
  USPC .................................. 701/104; 123/90.15

(58) Field of Classification Search
  USPC ............ 123/90.15, 90.16, 90.17, 90.18, 345, 123/346, 347, 348, 568.14; 701/102, 103, 701/104, 109
  See application file for complete search history.

(56) References Cited

U.S. PATENT DOCUMENTS

| 2008/0033628 A1* | 2/2008 | Guzzella et al. ............... 701/103 |
| 2009/0070009 A1* | 3/2009 | Delp ............................. 701/103 |
| 2011/0054760 A1* | 3/2011 | Ogawa et al. ................. 701/102 |
| 2012/0316756 A1* | 12/2012 | Tsuyuki ........................ 701/104 |

FOREIGN PATENT DOCUMENTS

| JP | 63-297746 A | 12/1988 |
| JP | 2003-293821 A | 10/2003 |
| JP | 2004-036406 A | 2/2004 |
| JP | 2005-133632 A | 5/2005 |
| JP | 2005-320937 A | 11/2005 |
| JP | 2006-017053 A | 1/2006 |
| JP | 2006-194112 A | 7/2006 |
| JP | 2008-025511 A | 2/2008 |
| JP | 2008-075549 A | 4/2008 |
| JP | 2009-085014 A | 4/2009 |

* cited by examiner

Primary Examiner — Stephen K Cronin
Assistant Examiner — Sizo Vilakazi
(74) Attorney, Agent, or Firm — Kenyon & Kenyon LLP

(57) ABSTRACT

The present invention aims to provide a control apparatus for an internal combustion engine that can precisely determine the presence or absence of blow-by of fresh air into an exhaust path in the internal combustion engine with a supercharger. A control apparatus for an internal combustion engine according to the present invention includes: a supercharger; an intake pipe pressure obtaining unit that detects or estimates an intake pipe pressure; an intake variable valve apparatus capable of changing a valve timing of an intake valve; an exhaust variable valve apparatus capable of changing a valve timing of an exhaust valve; a storing unit that stores information about a reference intake pipe pressure that is a value that depends on the valve timing of the intake valve but does not depend on the valve timing of the exhaust valve; a reference intake pipe pressure obtaining unit that obtains the reference intake pipe pressure for the valve timing of the intake valve; and a blow-by determining unit that determines the presence or absence of blow-by of fresh air into an exhaust side based on a result of comparison between the intake pipe pressure and the reference intake pipe pressure.

22 Claims, 7 Drawing Sheets

US 8,612,120 B2

CONTROL APPARATUS FOR INTERNAL COMBUSTION ENGINE

This is a 371 national phase application of PCT/JP2009/068841 filed 4 Nov. 2009, the content of which is incorporated herein by reference.

TECHNICAL FIELD

The present invention relates to a control apparatus for an internal combustion engine.

BACKGROUND ART

In an internal combustion engine with a supercharger, the intake pressure can be higher than the exhaust pressure. Therefore, in the valve overlap state where both the intake valve and the exhaust value are open, fresh air flowing into the combustion chamber can blow by into the exhaust side through the exhaust valve. The appropriate engine control specifications to improve the fuel consumption and emissions of the internal combustion engine with a supercharger vary with the presence or absence of blow-by of fresh air. Therefore, to optimize engine control, it is desirable to detect the presence or absence of blow-by of fresh air with high precision.

JP-A-2008-75549 discloses a system that calculates an internal EGR scavenging amount based on the intake gas pressure, the exhaust gas pressure, the engine speed and the state of control of the variable valve mechanism of the intake valve, determines the presence or absence of blow-by based on the internal EGR scavenging amount, and performs control to reduce the valve overlap period if it is determined that blow-by occurs.

Furthermore, JP-A-63-297746 discloses a system that previously determines the amount of intake gas blowing by into the exhaust side by experiment, stores, in the control unit, a map that represents the intake gas amount as a function of the engine speed and the engine load, and calculates the amount of intake gas blowing by into the exhaust side based on the map. In the case where blow-by of the intake gas occurs, the system calculates the injection fuel amount based on a value obtained by subtracting the amount of intake gas blowing by into the exhaust side from the intake air amount detected by the air flow meter.

PATENT DOCUMENT

Patent Document 1: JP-A-2008-75549
Patent Document 2: JP-A-2004-36406
Patent Document 3: JP-A-63-297746
Patent Document 4: JP-A-2005-320937

SUMMARY OF THE INVENTION

Problem to be Solved by the Invention

However, the method disclosed in JP-A-2008-75549 has a problem that the accuracy of calculation of the blow-by amount is poor even if the length of the intake pipe and the volume of the exhaust pipe (pulsation) are considered. This is probably because the flow coefficients of the intake valve and the exhaust valve are difficult to adapt, for example. In addition, if sensors are used to detect the intake gas pressure and the exhaust gas pressure, the problem of an increase of cost also arises. Besides the accuracy and cost problems, there is also a problem of an increase of calculation load.

The blow-by amount varies with the valve timing. According to the technique disclosed in JP-A-63-297746, the blow-by amount is stored in the form of a map with respect to the engine speed and the engine load, since it is assumed that the valve timing is a function of the engine speed and the engine load and, therefore, the blow-by amount is also a function of the engine speed and the engine load. However, in the actual engine control, the valve timing is not always a function of the engine speed or the engine load. The engine may run at a valve timing different from the preset valve timing during the transient operation or when a request from other controls occurs. Thus, the conventional technique described above cannot determine the presence or absence of blow-by with high precision. In addition, the number of adaptation steps in the development phase is too large if maps representing the blow-by amount as a function of the engine speed and the engine load are prepared for all the possible valve timings of the relevant engine. In particular, the number of adaptation steps is too large for an engine capable of changing not only the valve timing of the intake valve but also the valve timing of the exhaust valve.

The present invention has been devised to solve the problems described above, and an object of the present invention is to provide a control apparatus for an internal combustion engine with a supercharger that can determine the presence or absence of blow-by of fresh air into an exhaust path in the internal combustion engine with high precision.

Means for Solving the Problem

First aspect of the present invention is a control apparatus for an internal combustion engine, comprising:
a supercharger that has a compressor that compresses air in an intake path;
intake pipe pressure obtaining means that detects or estimates an intake pipe pressure;
an intake variable valve apparatus capable of changing a valve timing of an intake valve;
an exhaust variable valve apparatus capable of changing a valve timing of an exhaust valve;
storing means that stores information about a reference intake pipe pressure that is a value that depends on the valve timing of said intake valve but does not depend on the valve timing of said exhaust valve;
reference intake pipe pressure obtaining means that obtains the reference intake pipe pressure for the valve timing of said intake valve based on the information stored in said storing means; and
blow-by determining means that determines the presence or absence of blow-by of fresh air into an exhaust side based on a result of comparison between the intake pipe pressure detected or estimated by said intake pipe pressure obtaining means and the reference intake pipe pressure obtained by said reference intake pipe pressure obtaining means.

Second aspect of the present invention is the control apparatus for an internal combustion engine according to the first aspect, further comprising:
blow-by amount calculating means that calculates the amount of fresh air blowing by into the exhaust side based the intake pipe pressure detected or estimated by said intake pipe pressure obtaining means in a case where said blow-by determining means determines that blow-by occurs.

Third aspect of the present invention is the control apparatus for an internal combustion engine according to the first or the second aspect, wherein said reference intake pipe pressure is a value on a boundary between a region where the amount of fresh air flowing in through said intake valve decreases when the valve timing of said intake valve is fixed and the valve timing of said exhaust valve is delayed and a region where the amount of fresh air flowing in through said intake valve increases when the valve timing of said intake valve is fixed and the valve timing of said exhaust valve is delayed.

Fourth aspect of the present invention is the control apparatus for an internal combustion engine according to any one of the first to the third aspects, further comprising:

a fuel injection device;

cylinder fresh air amount calculating means that calculates the amount of fresh air charged to a cylinder based on the intake pipe pressure detected or estimated by said intake pipe pressure obtaining means in a case where said blow-by determining means determines that blow-by occurs;

first injection fuel amount calculating means that calculates an injection fuel amount based on a cylinder fresh air amount calculated by said cylinder fresh air amount calculating means and a target air-fuel ratio; and injection controlling means that makes said fuel injection device inject the amount of fuel calculated by said first injection fuel amount calculating means after said exhaust valve is closed in the case where said blow-by determining means determines that blow-by occurs.

Fifth aspect of the present invention is the control apparatus for an internal combustion engine according to the fourth aspect, wherein said fuel injection device includes a cylinder fuel injection device that injects fuel directly into the cylinder, and said injection controlling means makes said cylinder fuel injection device inject the amount of fuel calculated by said first injection fuel amount calculating means in the case where said blow-by determining means determines that blow-by occurs.

Sixth aspect of the present invention is the control apparatus for an internal combustion engine according to the fourth or the fifth aspect, further comprising:

flow-in fresh air amount calculating means that calculates the amount of fresh air flowing in through said intake valve; and second injection fuel amount calculating means that calculates the injection fuel amount based on a flow-in fresh air amount calculated by said flow-in fresh air amount calculating means and the target air-fuel ratio, wherein said injection controlling means makes said fuel injection device inject the amount of fuel calculated by said second injection fuel amount calculating means in the case where said blow-by determining means determines that blow-by does not occur.

Seventh aspect of the present invention is the control apparatus for an internal combustion engine according to the sixth aspect, further comprising:

rich spike controlling means that performs a rich spike control to temporarily make the air-fuel ratio of exhaust gas richer as required, wherein said injection controlling means makes said fuel injection device inject the amount of fuel calculated by said second injection fuel amount calculating means regardless of the result of the determination by said blow-by determining means in a case where said rich spike controlling means performs the rich spike control.

Eighth aspect of the present invention is the control apparatus for an internal combustion engine according to any one of the first to the seventh aspects, wherein said supercharger drives said compressor with a turbine activated by a flow of exhaust gas, said control apparatus further comprises compressor flow rate estimating means that estimates the flow rate of fresh air passing through said compressor based on a compressor model including a time constant associated with a delay of a change of the rotating speed of said supercharger with respect to a change of an intake flow rate in a transient operation state and a map representing a relationship between an intake flow rate and a supercharging pressure in a steady operation state, and said compressor flow rate estimating means includes compressor model correcting means that corrects at least one of said time constant and said map based on a parameter that affects the magnitude of exhaust energy.

Ninth aspect of the present invention is the control apparatus for an internal combustion engine according to the eighth aspect, further comprising:

blow-by amount calculating means that calculates the amount of fresh air blowing by into the exhaust side based on the intake pipe pressure detected or estimated by said intake pipe pressure obtaining means in the case where said blow-by determining means determines that blow-by occurs, wherein said compressor model correcting means includes means that corrects said time constant and said map using a blow-by amount calculated by said blow-by amount calculating means as said parameter.

Tenth aspect of the present invention is the control apparatus for an internal combustion engine according to the eighth aspect, further comprising:

exhaust gas recirculating means that allows exhaust gas recirculation; and exhaust gas recirculation amount obtaining means that obtains an exhaust gas recirculation amount, wherein said compressor model correcting means includes means that corrects said time constant and said map using the exhaust gas recirculation amount obtained by said exhaust gas recirculation amount obtaining means as said parameter.

Eleventh aspect of the present invention is the control apparatus for an internal combustion engine according to the eighth aspect, said compressor model correcting means includes means that corrects said time constant and said map using the valve timing of said exhaust valve as said parameter.

Twelfth aspect of the present invention is the control apparatus for an internal combustion engine according to the eighth aspect, further comprising:

ignition timing delay obtaining means that obtains an ignition timing delay in a case where an actual ignition timing is delayed from a normal ignition timing, wherein said compressor model correcting means includes means that corrects said time constant using said ignition timing delay as said parameter.

Advantageous Effects of the Invention

According to the first aspect of the present invention, the intake pipe pressure is detected or estimated, and the presence or absence of blow-by of fresh air into the exhaust side can be determined with high precision based on the result of comparison between the detected or estimated intake pipe pressure and the reference intake pipe pressure. The reference intake pipe pressure is a value that depends on the valve timing of the intake valve but does not depend on the valve timing of the exhaust valve. Therefore, the reference intake pipe pressure can be easily previously checked by experiment even for the internal combustion engine with an exhaust variable valve apparatus, and therefore, the number of adaptation steps in the development phase can be reduced.

According to the second aspect of the present invention, since the amount of fresh air blowing by into the exhaust side can be calculated, the control that involves correcting the injection fuel amount can be more appropriately performed even when blow-by of fresh air into the exhaust side occurs.

According to the third aspect of the present invention, the reference intake pipe pressure is a value on the boundary between the region where the amount of fresh air flowing in through the intake valve decreases when the valve timing of the intake valve is fixed and the valve timing of the exhaust valve is delayed and the region where the amount of fresh air flowing in through the intake valve increases when the valve timing of the intake valve is fixed and the valve timing of the exhaust valve is delayed, and therefore, the presence or absence of blow-by of fresh air into the exhaust side can be determined with high precision.

According to the fourth aspect of the present invention, the fresh air blowing by into the exhaust side can be prevented from containing unburnt fuel. That is, fuel can be reliably prevented from being wasted by flowing into the exhaust side without being burnt, and therefore, the fuel consumption can be improved. In addition, even when blow-by of fresh air into the exhaust side occurs, the air-fuel ratio in the cylinder can be made to exactly agree with the target air-fuel ratio.

According to the fifth aspect of the present invention, when it is determined that blow-by of fresh air into the exhaust side occurs, fuel can be injected into the cylinder. As a result, the fresh air blowing by into the exhaust side can be reliably prevented from containing unburnt fuel.

According to the sixth aspect of the present invention, when it is determined that blow-by of fresh air into the exhaust side does not occur, the injection fuel amount is calculated based on the amount of fresh air flowing in through the intake valve and the target air-fuel ratio. As a result, the air-fuel ratio in the cylinder can be made to agree with the target air-fuel ratio.

According to the seventh aspect of the present invention, in the case where the rich spike control is performed, the amount of fuel calculated based on the amount of fresh air flowing in through the intake valve and the target air-fuel ratio can be injected regardless of the presence or absence of blow-by. As a result, during the rich spike control, the air-fuel ratio of the exhaust gas can be made to exactly agree with the target rich air-fuel ratio regardless of the presence or absence of blow-by, so that a high exhaust gas purification ratio can be achieved.

According to the eighth aspect of the present invention, the accuracy of estimation of the compressor flow rate based on the compressor model can be improved.

According to the ninth aspect of the present invention, the effect of the blow-by of fresh air into the exhaust side can be appropriately reflected in the compressor model, and therefore, the accuracy of estimation of the compressor flow rate can be improved.

According to the tenth aspect of the present invention, the effect of the exhaust gas recirculation can be appropriately reflected in the compressor model, and therefore, the accuracy of estimation of the compressor flow rate can be improved.

According to the eleventh aspect of the present invention, the effect of the valve timing of the exhaust valve can be appropriately reflected in the compressor model, and therefore, the accuracy of estimation of the compressor flow rate can be improved.

According to the twelfth aspect of the present invention, the effect of the ignition timing delay control can be appropriately reflected in the compressor model, and therefore, the accuracy of estimation of the compressor flow rate can be improved.

BEST MODE FOR CARRYING OUT THE INVENTION

Figure 1:
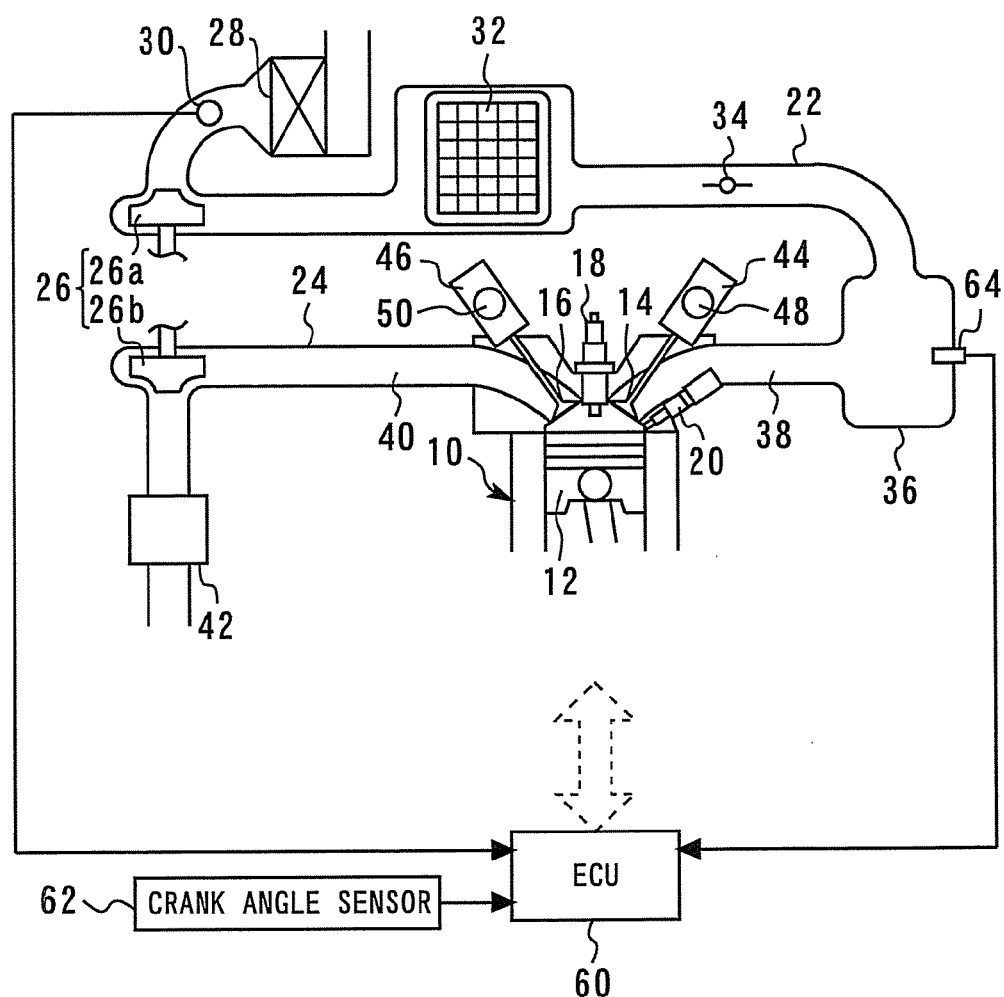
FIG. 1 shows the configuration of a system according to a first embodiment of the present invention.

In the following, embodiments of the present invention will be described with reference to the drawings. The same components are denoted by the same reference numerals throughout the drawings, and redundant descriptions thereof will be omitted.

Embodiment 1

FIG. 1 is a diagram for illustrating a configuration of a system according to an embodiment 1 of the present invention. As shown in FIG. 1, the system comprises an internal combustion engine 10. The internal combustion engine 10 according to this embodiment is the spark ignition type and is capable of lean burn. The internal combustion engine 10 can have any number of cylinders, and the cylinders can be arranged in any configuration. FIG. 1 shows one cylinder as a representative example.

Each cylinder in the internal combustion engine 10 comprises a piston 12, an intake valve 14, an exhaust valve 16, an ignition plug 18, and a cylinder injector 20 that injects fuel directly into the cylinder (a combustion chamber). The intake valve 14 is in communication with an intake path 22 (a surge tank) via an intake pipe 38. The exhaust valve 16 is in communication with an exhaust path 24 via an exhaust pipe 40.

The internal combustion engine 10 according to this embodiment further comprises a turbo supercharger 26, an intake variable valve apparatus 44, and an exhaust variable valve apparatus 46.

The turbo supercharger 26 has a compressor 26a and a turbine 26b. The turbine 26b is disposed in the exhaust path 24 and is energized to rotate by the exhaust gas flowing through the exhaust path 24. The compressor 26a is disposed in the intake path 22 and driven by the turbine 26b to rotate to compress the air in the intake path 22. In the following description, the rotating speed of the turbo supercharger 26 is referred to as a turbo rotating speed hereinafter.

An air cleaner 28 and an air flow meter 30 that detects the amount of intake gas are disposed in a part of the intake path 22 upstream from the compressor 26a. An inter cooler 32, a throttle valve 34 and the surge tank 36 are disposed in a part of the intake path 22 downstream from the compressor 26a.

A NOx storage reduction three-way catalyst 42 is disposed in a part of the exhaust path 24 downstream from the turbine 26b. The NOx storage reduction three-way catalyst 42 can store NOx when the exhaust gas flowing thereto has a lean air-fuel ratio. The NOx storage reduction three-way catalyst 42 can purify the stored NOx by reducing the stored NOx into $N_2$ and discharge the resulting $N_2$ when the exhaust gas flowing thereto has a rich air-fuel ratio.

The intake variable valve apparatus 44 can change the valve timing (referred to as an intake valve timing hereinafter) InVT of the intake valve 14. For example, the intake variable valve apparatus 44 may be a mechanism in which an actuator changes the rotational phase of a camshaft that drives the intake valve 14 with respect to the rotational phase of a crankshaft (not shown) of the internal combustion engine 10. The rotational angle of the camshaft that drives the intake valve 14 is detected by a cam position sensor 48. Based on a signal from the cam position sensor 48, an actual (current) intake valve timing InVT can be detected.

The exhaust variable valve apparatus 46 can change the valve timing (referred to as an exhaust valve timing hereinafter) ExVT of the exhaust valve 16. For example, the exhaust variable valve apparatus 46 may be a mechanism in which an actuator changes the rotational phase of a camshaft that drives the exhaust valve 16 with respect to the rotational phase of the crankshaft (not shown) of the internal combustion engine 10. The rotational angle of the camshaft that drives the exhaust valve 16 is detected by a cam position sensor 50. Based on a signal from the cam position sensor 50, an actual (current) exhaust valve timing ExVT can be detected.

The present invention is not limited to the configurations of the intake variable valve apparatus 44 and the exhaust variable valve apparatus 46 described above. Rather, the intake variable valve apparatus 44 or the exhaust variable valve apparatus 46 may be any mechanism, such as a mechanism capable of changing the angle of action of the intake valve 14 or the exhaust valve 16 and a mechanism capable of electromagnetically opening or closing the intake valve 14 or the exhaust valve 16 at an arbitrary point in time.

In the following description, advancing the intake valve timing InVT or the exhaust valve timing ExVT is referred to also as "timing advancing", and delaying the intake valve timing InVT or the exhaust valve timing ExVT is referred to also as "timing delaying".

The system according to this embodiment further comprises an electronic control unit (ECU) 60. In addition to the various sensors and actuators described above, a crank angle sensor 62 that detects the rotational angle of the crankshaft of the internal combustion engine 10 and an intake pipe pressure sensor 64 that detects the pressure Pm in the intake pipe 38 (referred to as an intake pipe pressure hereinafter) are electrically connected to the ECU 60.

Figure 2:
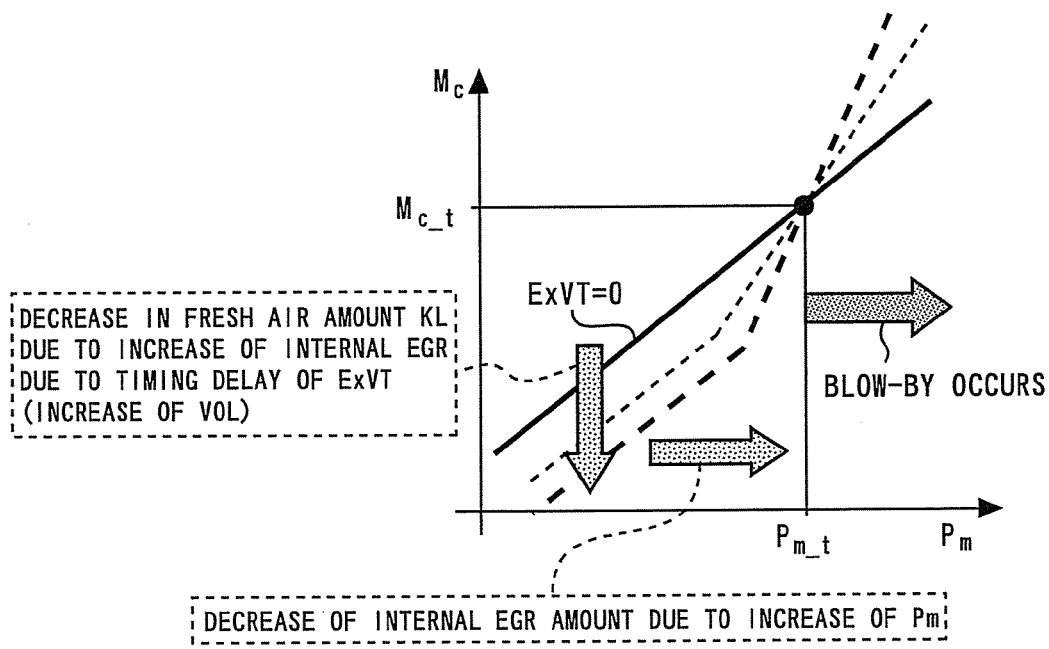
FIG. 2 is a graph showing the Pm-Mc relationship in a case where an intake valve timing InVT is fixed, and an exhaust valve timing ExVT varies.

The amount of fresh air flowing into the combustion chamber through the intake valve 14 (referred to as an intake valve passing-through fresh air amount hereinafter) Mc depends on the intake pipe pressure Pm. This relationship is referred to as a Pm-Mc relationship hereinafter. FIG. 2 is a graph showing the Pm-Mc relationship in a case where the intake valve timing InVT is fixed, and the exhaust valve timing ExVT varies. In FIG. 2, the solid line indicates a condition where the timing delay of the exhaust valve timing ExVT is zero, that is, a condition where the timing advance of the exhaust valve timing ExVT is at the maximum. As the timing delay of the exhaust valve timing ExVT increases from this condition, the graph showing the Pm-Mc relationship gradually changes from the solid line to the thin dashed line and then to the thick dashed line. In other words, FIG. 2 shows three graphs showing the respective Pm-Mc relationships for different exhaust valve timings ExVT and a fixed intake valve timing InVT. The three graphs intersect with each other at a point (Pm_t, Mc_t). Thus, the inventor has found out by experiment that any graph showing the Pm-Mc relationship for a supercharged engine passes through a certain point (Pm_t, Mc_t) regardless of the value of the exhaust valve timing ExVT as far as the intake valve timing InVT is fixed. The pressure Pm_t at the point is referred to as a reference intake pipe pressure hereinafter.

If the intake valve timing InVT is fixed, as the timing delay of the exhaust valve timing ExVT increases, the period in which both the exhaust valve 16 and the intake valve 14 are open, which is referred to also as a valve overlap period, increases. In the valve overlap period, if the exhaust pressure is higher than the intake pipe pressure Pm, the exhaust gas in the exhaust port flows back through the exhaust valve 16 to cause an internal exhaust gas recirculation (EGR). When the internal EGR occurs, the internal EGR amount (which means the amount of exhaust gas residing in the cylinders as a result of the internal EGR) increases as the valve overlap period increases. As the internal EGR amount increases, the intake valve passing-through fresh air amount Mc decreases accordingly.

In the following, the internal EGR amount is denoted by Me. When the internal EGR occurs, the amount of gas charged to the cylinders is a sum of the intake valve passing-through fresh air amount Mc and the internal EGR amount Me. Considering the fact that the cylinder pressure Pc at the point in time when the intake valve 14 is closed is equal to the intake pipe pressure Pm, a characteristic equation for the gas in the cylinders at the point in time when the intake valve 14 is closed can be expressed by the following formula.

$$Pm*Vc=(Mc+Me)Rc*Tc \quad (1)$$

In this formula, Vc denotes the cylinder volume at the point in time when the intake valve 14 is closed and can be calculated based on the intake valve timing InVT. Rc denotes a gas constant, and Tc denotes an intake gas temperature. The formula (I) can be transformed into the following formula.

$$Mc=\{Vc/(Rc*Tc)\}Pm-Me \quad (2)$$

As shown in FIG. 2, in a region where the intake pipe pressure Pm is lower than the reference intake pipe pressure Pm_t, the intake valve passing-through fresh air amount Mc tends to decrease as the timing delay of the exhaust valve timing ExVT increases. This phenomenon can be considered to be caused by the internal EGR amount increasing as the valve overlap period increases as the timing delay of the exhaust valve timing ExVT increases.

In contrast to the tendency described above, in a region where the intake pipe pressure Pm is higher than the reference intake pipe pressure Pm_t, the intake valve passing-through fresh air amount Mc tends to increase as the timing delay of the exhaust valve timing ExVT increases. Blow-by of fresh air that occurs during supercharging can be considered as a cause of the inversion of the direction of the change of the intake valve passing-through fresh air amount Mc in response to a change of the exhaust valve timing ExVT at the reference intake pipe pressure Pm_t.

In the condition that the intake pipe pressure Pm is raised by supercharging, some of the fresh air flowing into the combustion chamber through the intake valve 14 can leak into the exhaust side (the side of the exhaust pipe 40) through the exhaust valve 16 during the valve overlap period. This phenomenon is referred to as blow-by. When blow-by of fresh air occurs, the amount of fresh air blowing by into the exhaust side (referred to as a blow-by amount hereinafter) Mex increases as the valve overlap period increases. In view of this fact, the phenomenon that the intake valve passing-through fresh air amount Mc increases as the timing delay of the exhaust valve timing ExVT increases in the region where the intake pipe pressure Pm is higher than the reference intake pipe pressure Pm_t can be considered to be caused by the blow-by amount Mex increasing as the valve overlap period increases.

From the above description, it can be concluded that the region where the intake pipe pressure Pm is higher than the reference intake pipe pressure Pm_t (that is, the region where a condition Pm>Pm_t is met) is a region where blow-by of fresh air occurs. Therefore, the presence or absence of blow-by of fresh air can be determined with high precision by comparing the intake pipe pressure Pm with the reference intake pipe pressure Pm_t.

If the intake valve timing InVT changes, the reference intake pipe pressure Pm_t also changes. However, as described above, if the intake valve timing InVT is fixed, the reference intake pipe pressure Pm_t is also fixed even if the exhaust valve timing ExVT changes. Therefore, it is easy to previously check the reference intake pipe pressure Pm_t by experiment and stores the reference intake pipe pressure Pm_t in the ECU 60 in the form of a map.

When blow-by of fresh air occurs, the exhaust gas does not flow back through the exhaust valve 16 during the valve overlap period, so that the internal EGR amount Me can be regarded as zero. Therefore, when blow-by of fresh air occurs, the gas charged to the cylinders can be considered as 100% fresh air. Even when blow-by of fresh air occurs, the cylinder pressure Pc at the point in time when the intake valve 14 is closed is equal to the intake pipe pressure Pm. Therefore, assuming that the amount of fresh air charged to the cylinders (referred to as a cylinder fresh air amount hereinafter) is denoted by $M_{cylinder}$, the characteristic equation of the gas in the cylinders at the point in time when the intake valve 14 is closed in the case where blow-by of fresh air occurs can be expressed by the following formula.

$$Pm*Vc=M_{cylinder}*Rc*Tc \qquad (3)$$

Therefore, the cylinder fresh air amount $M_{cylinder}$ in the case where blow-by of fresh air occurs can be calculated according to the following formula, which is transformed from the formula (3) described above.

$$M_{cylinder}=\{Vc/(Rc*Tc)\}Pm \qquad (4)$$

As can be seen from the formula (4) described above, in the region where the blow-by of fresh air occurs, that is, in the region where the condition Pm>Pm_t is met, the cylinder fresh air amount $M_{cylinder}$ is fixed regardless of the exhaust valve timing ExVT as far as the intake pipe pressure Pm is fixed.

The intake valve passing-through fresh air amount Mc in the case where blow-by of fresh air occurs can be considered as a sum of the cylinder fresh air amount $M_{cylinder}$ and the blow-by amount Mex. In other words, the blow-by amount Mex can be considered as the difference between the intake valve passing-through fresh air amount Mc and the cylinder fresh air amount $M_{cylinder}$. Therefore, the blow-by amount Mex can be calculated according to the following formula.

$$Mex=Mc-M_{cylinder} \qquad (5)$$

Figure 3:
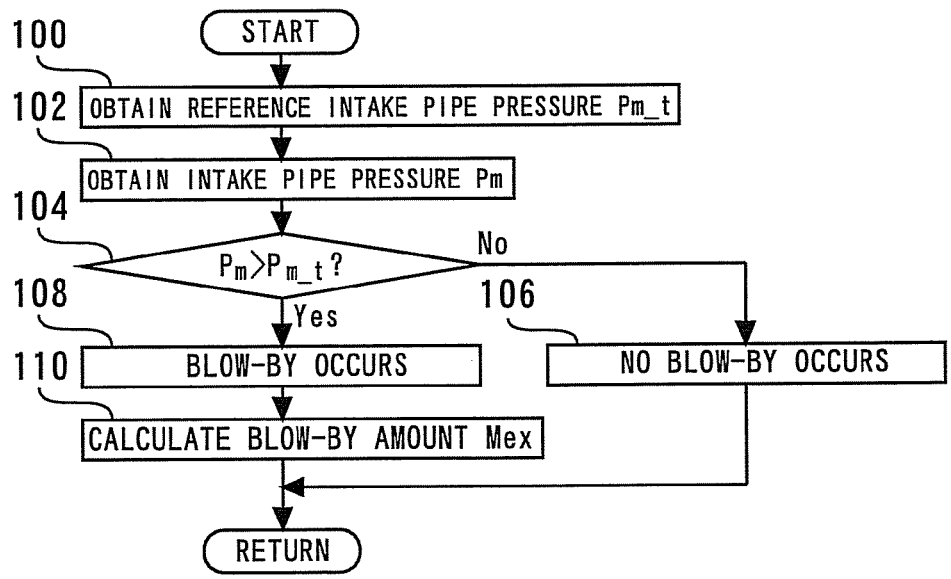
FIG. 3 is a flowchart illustrating a routine that is executed by the first embodiment of the present invention.

In this embodiment, the presence or absence of blow-by of fresh air in the internal combustion engine 10 is determined based on the principle described above. FIG. 3 is a flowchart showing a routine executed by the ECU 60 to make the determination. According to the routine shown in FIG. 3, first, the reference intake pipe pressure Pm_t for the current intake valve timing InVT is obtained (step 100). As described above, the reference intake pipe pressure Pm_t varies with the intake valve timing InVT but does not depend on the exhaust valve timing ExVT. The ECU 60 stores a map that represents the relationship between the intake valve timing InVT and the reference intake pipe pressure Pm_t previously checked by experiment. In step 100, the reference intake pipe pressure Pm_t is calculated based on the map and the current intake valve timing InVT detected by the cam position sensor 48.

If the reference intake pipe pressure Pm_t needs to be corrected to suit the engine speed, the map of the reference intake pipe pressure Pm_t can be created by considering the relationship between the reference intake pipe pressure Pm_t and the engine speed, and the reference intake pipe pressure Pm_t can be calculated by additionally considering the current engine speed detected by the crank angle sensor 62.

Following the processing in step 100, the current intake pipe pressure Pm is obtained (step 102). In this embodiment, the intake pipe pressure sensor 64 can detects the current intake pipe pressure Pm. In the present invention, however, as an alternative, a known estimation method using a physical model of the intake system can also be used to obtain the current intake pipe pressure Pm. An example of the physical model of the intake system will be described later with regard to an embodiment 4.

Then, the reference intake pipe pressure Pm_t obtained in step 100 and the intake pipe pressure Pm obtained in step 102 are compared with each other (step 104). If the result of the comparison shows that the intake pipe pressure Pm is equal to or lower than the reference intake pipe pressure Pm_t, it is determined that blow-by of fresh air does not occur (step 106). On the other hand, if the result of the comparison shows that the intake pipe pressure Pm is higher than the reference intake pipe pressure Pm_t, it is determined that blow-by of fresh air occurs (step 108).

If it is determined that blow-by of fresh air occurs, the blow-by amount Mex is calculated (step 110). In step 110, first, the cylinder fresh air amount $M_{cylinder}$ is calculated. The cylinder fresh air amount $M_{cylinder}$ can be calculated according to the formula (4) described above based on the intake pipe pressure Pm, the cylinder volume Vc at the time when the intake valve is closed that depends on the intake valve timing InVT, and the intake gas temperature Tc. The intake gas temperature Tc can be detected by an intake gas temperature sensor (not shown) or estimated by a known estimation method. Then, the intake valve passing-through fresh air amount Mc is calculated as follows. That is, the ECU 60 previously stores such maps as shown in FIG. 2 that represent Pm-Mc relationships for different intake valve timings InVT. The Pm-Mc relationship for the current intake valve timing InVT and the current exhaust valve timing ExVT can be determined from the Pm-Mc relationship maps. Then, the intake valve passing-through fresh air amount Mc can be determined by substituting the current intake pipe pressure Pm into the determined Pm-Mc relationship. In step 110, the blow-by amount Mex can be calculated according to the formula (5) described above based on the cylinder fresh air amount $M_{cylinder}$ and the intake valve passing-through fresh air amount Mc calculated in this way.

As described above, according to this embodiment, the presence or absence of blow-by of fresh air can be determined with high precision with a simple arrangement, and the blow-by amount Mex can be accurately calculated. Therefore, various characteristics including the fuel consumption and emissions can be improved by correcting the control specifications for the internal combustion engine 10 based on the result of the determination and the calculated value of the blow-by amount Mex.

In the embodiment 1 described above, the intake pipe pressure sensor 64 corresponds to the "intake pipe pressure obtaining means" according to the first aspect of the present invention described earlier, and the ECU 60 corresponds to the "storage means" according to the first aspect of the present invention. In addition, the ECU 60 performs the processing in step 100 to implement the "reference intake pipe pressure obtaining means" according to the first aspect of the present invention, performs the processings in steps 104, 106 and 108 to implement the "blow-by determining means" according to the first aspect of the present invention, and performs the processing in step 110 to implement the "blow-by amount calculating means" according to the second aspect of the present invention described earlier.

Embodiment 2

Next, an embodiment 2 of the present invention will be described with reference to FIG. 4. However, the following description will be primarily focused on differences from the embodiment 1 described above, and descriptions of similar matters will be simplified or omitted.

If the blow-by fresh air flowing into the exhaust side contains fuel, the fuel makes no contribution to the power of the engine and is wasted. Therefore, when blow-by occurs, it is desirable to prevent the blow-by fresh air from containing fuel. Thus, according to this embodiment, when it is determined that blow-by occurs, the cylinder injector 20 injects the whole of the required amount of fuel directly into the cylinders after the exhaust valve 16 is closed.

Figure 4:
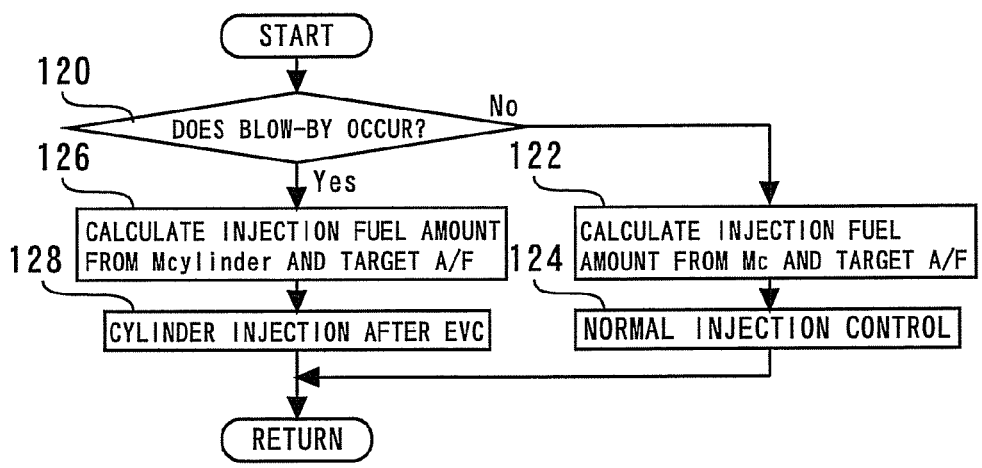
FIG. 4 is a flowchart illustrating a routine that is executed by a second embodiment of the present invention.

FIG. 4 is a flowchart showing a routine performed by the ECU 60 to serve the function described above according to this embodiment. According to the routine shown in FIG. 4, first, the presence or absence of blow-by of fresh air is determined (step 120). In step 120, the presence or absence of blow-by of fresh air can be determined by performing the same processings as those in steps 100 to 108 shown in FIG. 3 described above.

If it is determined in step 120 that blow-by does not occur, a normal fuel injection control is performed as follows. That is, first, the intake valve passing-through fresh air amount Mc is divided by a target air-fuel ratio to calculate the injection fuel amount (step 122). The intake valve passing-through fresh air amount Mc is calculated as described above with regard to step 110 shown in FIG. 3. Then, the amount of fuel calculated in step 122 is injected in a normal procedure (step 124). The injection timing in step 124 is a preset normal injection timing. If the internal combustion engine is provided with a port injector (not shown) that injects fuel into an intake port in addition to the cylinder injector 20, the cylinder injector 20 and the port injector may be used in combination to inject the amount of fuel calculated in step 122, or the port injector may inject the whole of the calculated amount of fuel.

If blow-by does not occur, the amount of fresh air charged to the cylinders is equal to the intake valve passing-through fresh air amount Mc. Therefore, the air-fuel ratio in the cylinders can be made to agree with the target air-fuel ratio by calculating the injection fuel amount in the manner described above with regard to step 122.

On the other hand, if it is determined in step 120 that blow-by occurs, a fuel injection control described below is performed. That is, first, the cylinder fresh air amount $M_{cylinder}$ is divided by a target air-fuel ratio to calculate the injection fuel amount (step 126). The cylinder fresh air amount $M_{cylinder}$ is calculated as described above with regard to step 110 shown in FIG. 3. Then, the cylinder injector 20 injects the amount of fuel calculated in step 126 in an intake stroke or a compression stroke after the exhaust valve 16 is closed (step 128).

Blow-by of fresh air completely stops when the exhaust valve 16 is closed. Therefore, even if it is determined that blow-by of fresh air occurs, the fresh air blowing by into the exhaust side contains no fuel if the injector 20 starts injecting fuel after the exhaust valve 16 is closed. Thus, fuel can be reliably prevented from being wasted because of blow-by, and the fuel consumption can be improved.

If blow-by of fresh air occurs, the intake valve passing-through fresh air amount Mc includes the blow-by amount Mex in addition to the cylinder fresh air amount $M_{cylinder}$. Therefore, if the injection fuel amount is calculated from the intake valve passing-through fresh air amount Mc and the target air-fuel ratio, the air-fuel ratio in the cylinders shifts to the rich side from the target air-fuel ratio. However, according to this embodiment, when blow-by of fresh air occurs, the air-fuel ratio in the cylinders can be made to agree with the target air-fuel ratio by calculating the injection fuel amount from the cylinder fresh air amount $M_{cylinder}$ and the target air-fuel ratio.

In the embodiment 2 described above, when it is determined that blow-by of fresh air occurs, the cylinder injector 20 starts injecting fuel after the exhaust valve 16 is closed. However, if the internal combustion engine has a port injector, the port injector may start injecting fuel in a period (intake stroke) after the exhaust valve 16 is closed and before the intake valve 14 is closed. During this period, the port injector can inject fuel into the cylinder.

In the embodiment 2 described above, the cylinder injector 20 corresponds the "fuel injection device" according to the fourth aspect of the present invention described earlier and the "cylinder fuel injection device" according to the fifth aspect of the present invention described earlier, and the intake valve passing-through fresh air amount Mc corresponds to the "flow-in fresh air amount" according to the sixth aspect of the present invention described earlier. In addition, the ECU 60 performs the processing in step 126 to implement the "cylinder fresh air amount calculating means" and the "first injection fuel amount calculating means" according to the fourth aspect of the present invention, performs the processing in step 128 to implement the "injection controlling means" according to the fourth and fifth aspects of the present invention, performs the processing in step 122 to implement the "flow-in fresh air amount calculating means" and the "second injection fuel amount calculating means" according to the sixth aspect of the present invention, and performs the processing in step 128 to implement the "injection controlling means" according to the sixth aspect of the present invention.

Embodiment 3

Next, an embodiment 3 of the present invention will be described with reference to FIG. 5. However, the following description will be primarily focused on differences from the embodiments 1 and 2 described above, and descriptions of similar matters will be simplified or omitted.

The NOx storage reduction three-way catalyst 42 is disposed in the exhaust path 24 of the internal combustion engine 10 according to this embodiment shown in FIG. 1. If the air-fuel ratio of the internal combustion engine during operation is leaner than a theoretical air-fuel ratio, the NOx storage reduction three-way catalyst 42 can trap and store NOx in the exhaust gas. The amount of NOx stored by the NOx storage reduction three-way catalyst 42 is limited. The ECU 60 calculates the amount of NOx stored by the NOx storage reduction three-way catalyst 42 in a known manner. The ECU 60 performs a rich spike control, which is to temporarily set the target air-fuel ratio at a rich air-fuel ratio equal to or lower than the theoretical air-fuel ratio, before the calculated amount of stored NOx reaches the limit. As a result of the rich spike control, exhaust gas having a rich air-fuel ratio equal to or lower than the theoretical air-fuel ratio flows to the NOx storage reduction three-way catalyst 42. The NOx stored by the NOx storage reduction three-way catalyst 42 is purified by being reduced into $N_2$ by unburnt constituents of the exhaust gas, such as HC and CO, and the resulting $N_2$ is released. As a result, the NOx storage reduction three-way catalyst 42 restores the ability to trap NOx, and the internal combustion engine 10 can return to the lean burn operation.

As described above, in the embodiment 2, if it is determined that blow-by of fresh air occurs, the injection fuel amount is calculated form the cylinder fresh air amount $M_{cylinder}$ and the target air-fuel ratio, and the cylinder injector 20 is controlled to start injecting fuel after the exhaust valve 16 is closed. However, if this control is performed during the rich spike control, lean blow-by fresh air containing no fuel flows to the NOx storage reduction three-way catalyst 42, so that the NOx reduction efficiency can decrease. In addition, if the injection fuel amount is calculated from the cylinder fresh air amount $M_{cylinder}$ and the target air-fuel ratio, the air-fuel ratio of the whole of the exhaust gas including the blow-by fresh air is leaner than the target air-fuel ratio, although the air-fuel ratio in the cylinders agrees with the target air-fuel ratio. That is, the air-fuel ratio of the exhaust gas flowing to the NOx storage reduction three-way catalyst 42 is leaner than the target air-fuel ratio. This also leads to a decrease of the NOx reduction efficiency.

To overcome the disadvantages described above, according to this embodiment, the injection fuel amount is calculated from the intake valve passing-through fresh air amount Mc and the target air-fuel ratio regardless of the presence or absence of blow-by of fresh air during the rich spike control.

Figure 5:
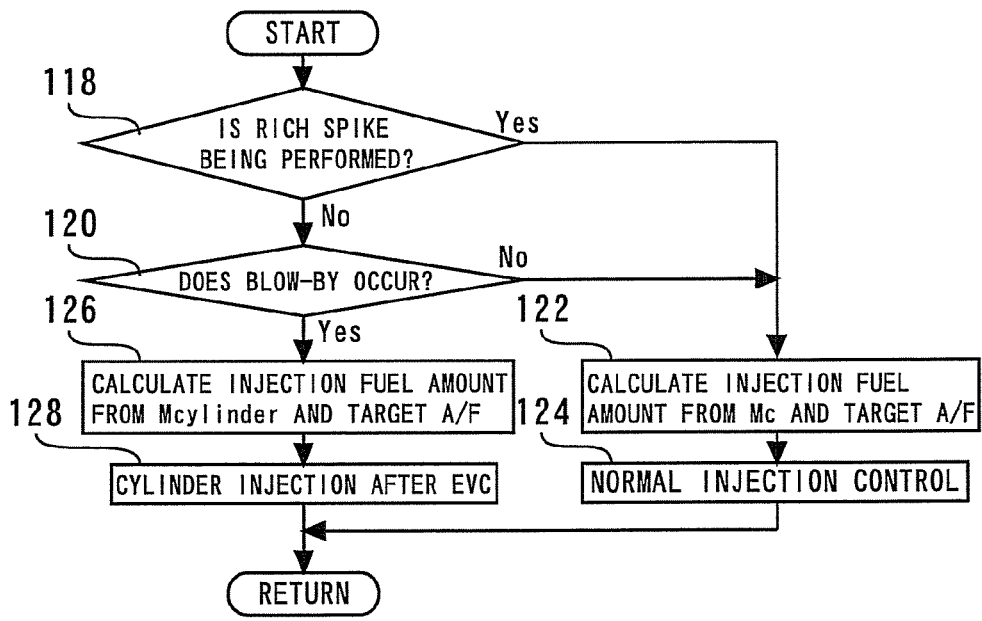
FIG. 5 is a flowchart illustrating a routine that is executed by a third embodiment of the present invention.

FIG. 5 is a flowchart showing a routine performed by the ECU 60 to serve the function described above according to this embodiment. The routine shown in FIG. 5 is the same as the routine shown in FIG. 4 except that the routine additionally includes step 118 before step 120. According to the routine shown in FIG. 5, first, it is determined whether or not the rich spike control is being performed (step 118). If it is determined in step 118 that the rich spike control is not being performed, the process from step 120 is performed. The process is the same as that according to the embodiment 2 described above.

However, if it is determined in step 118 that the rich spike control is being performed, the process from step 122 is performed. That is, the injection fuel amount is calculated from the intake valve passing-through fresh air amount Mc and the target air-fuel ratio (step 122), and the calculated amount of fuel is injected in a normal procedure (step 124). The processings in the routine shown in FIG. 5 are the same as those in the routine according to the embodiment 2 shown in FIG. 4 except for the points described above and therefore will not be further described.

According to the control according to this embodiment described above, even if blow-by of fresh air occurs, the injection fuel amount is calculated from the intake valve passing-through fresh air amount Mc and the target air-fuel ratio during the rich spike control. Therefore, the air-fuel ratio of the whole of the exhaust gas including the blow-by fresh air can be made to agree with the target air-fuel ratio. As a result, exhaust gas having a predetermined rich air-fuel ratio set in the rich spike control can be flowed to the NOx storage reduction three-way catalyst 42 with reliability, and thus, high NOx reduction efficiency can be achieved.

In the embodiment 3 described above, the ECU 60 performs the rich spike control described above to implement the "rich spike controlling means" according to the seventh aspect of the present invention described earlier and performs the processings in the routine shown in FIG. 5 to implement the "injection controlling means" according to the seventh aspect of the present invention.

Embodiment 4

Next, an embodiment 4 of the present invention will be described with reference to FIGS. 6 to 8. However, the following description will be primarily focused on differences from the embodiments 1 and 2 described above, and descriptions of similar matters will be simplified or omitted.

In the embodiments 1 to 3 described above, as the method of obtaining the intake pipe pressure Pm, the intake pipe pressure sensor 64 is provided to directly detect the intake pipe pressure Pm. However, according to this embodiment, a physical model (an air model) of the intake system described below is used to estimate the intake pipe pressure Pm.

In the following description, the pressure in a part upstream from the compressor 26a (referred to as a compressor upstream pressure hereinafter) is denoted by Pa, the pressure in a part downstream from the inter cooler 32 (upstream from the throttle valve 34) (referred to as a supercharging pressure hereinafter) is denoted by Pic, the flow rate of fresh air passing through the compressor 26a (referred to as a compressor flow rate hereinafter) is denoted by Mcp, and the flow rate of fresh air passing through the throttle valve 34 (referred to as a throttle flow rate hereinafter) is denoted by Mt.

The ECU 60 repeatedly performs the sequence of calculations described below every predetermined period to update the values of the intake pipe pressure Pm and other physical quantities of the intake system.

The throttle flow rate Mt is calculated according to the following formula.

$$Mt = f(Pm/Pic) \quad (6)$$

In the formula (6) described above, f(x) represents a function of x. The values of the intake pipe pressure Pm and the supercharging pressure Pic are the values currently stored in a memory, that is, the values obtained in the previous calculation.

The intake valve passing-through fresh air amount Mc is calculated based on the value of the intake pipe pressure Pm currently stored in the memory (the value of the intake pipe pressure Pm obtained in the previous calculation) and the Pm-Mc relationship map described above.

The supercharging pressure Pic is updated by calculation according to the following formula.

$$Pic = Pic(\text{previous value}) + K^*(Mcp - Mt) \quad (7)$$

In the formula (7) described above, the value of the throttle flow rate Mt is the value previously calculated according to the formula (6). The value of the compressor flow rate Mcp is the value calculated by using a compressor model described later. K represents a constant.

The intake pipe pressure Pm is updated by calculation according to the following formula (8).

$$Pm = Pm(\text{previous value}) + Km^*(Mt - Mc) \quad (8)$$

In the formula (8) described above, the value of the throttle flow rate Mt is the value previously calculated according to the formula (6), and the value of the intake valve passing-through fresh air amount Mc is the value previously calculated by using the Pm-Mc relationship map. Km represents a constant.

Next, a compressor model used to estimate the compressor flow rate Mcp will be described. FIG. 6 is a block diagram showing a compressor model used in this embodiment. The compressor model is to calculate the compressor flow rate Mcp based on the intake valve passing-through fresh air amount Mc (previous value), the supercharging pressure Pic (previous value) and the compressor upstream pressure Pa. The compressor upstream pressure Pa is measured by an atmospheric pressure sensor (not shown).

Figure 6:
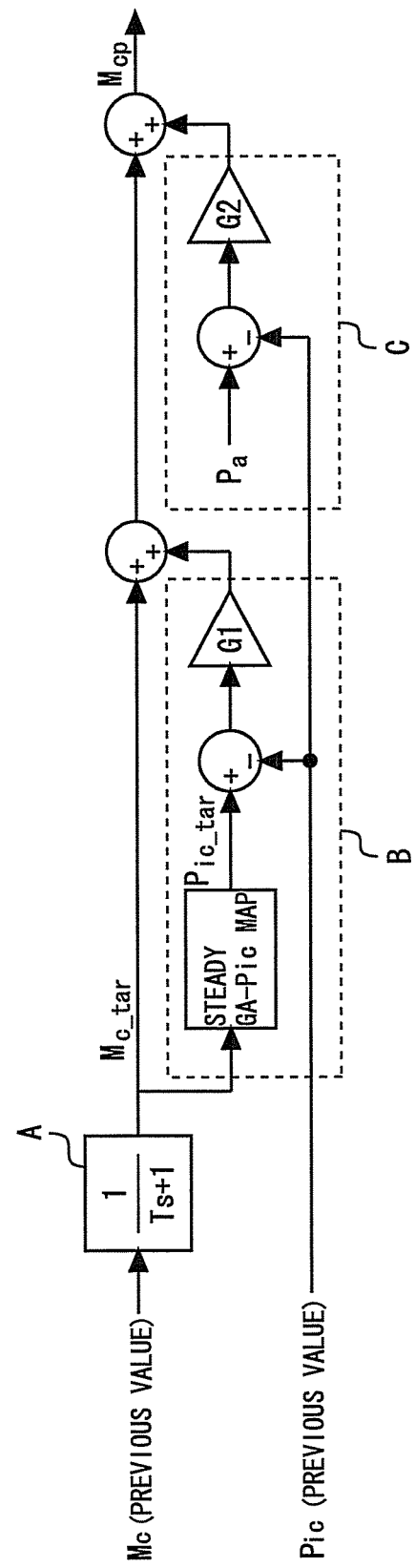
FIG. 6 is a block diagram showing a compressor model used in a fourth embodiment.
Figure 7:
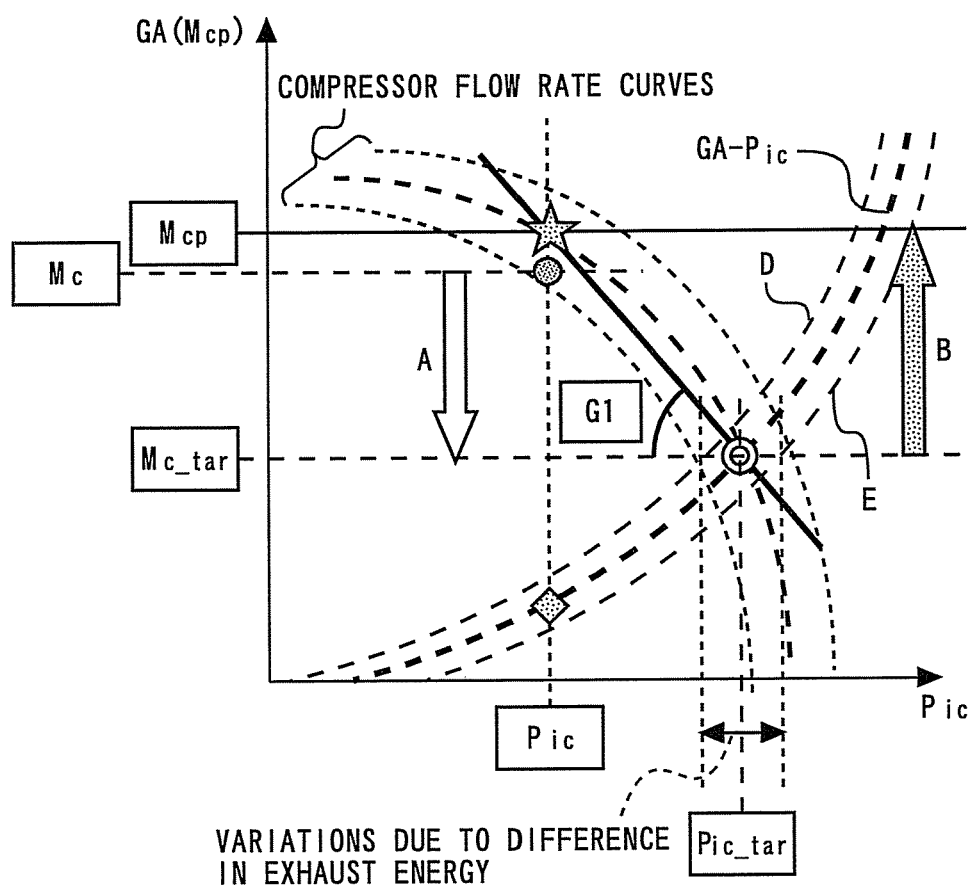
FIG. 7 is a diagram for illustrating a method of calculating a compressor flow rate Mcp using the compressor model shown in FIG. 6.

FIG. 7 is a diagram for illustrating a method of calculating the compressor flow rate Mcp using the compressor model shown in FIG. 6. An upward sloping curve GA-Pic in FIG. 7 shows a relationship between the intake flow rate GA and the supercharging pressure Pic in a steady operation state. The ECU 60 previously stores the relationship previously determined by experiment in the form of a map. The map is referred to as a steady GA-Pic map hereinafter. A plurality of downward sloping curves in FIG. 7 show compressor flow rates at different turbo rotating speeds. The compressor flow rate curve shifts to higher pressure side and higher flow rate side as the turbo rotating speed increases.

As shown in FIG. 6, the compressor model has a first-order lag element A, a section B and a section C. The first-order lag element A receives the intake valve passing-through fresh air amount Mc (previous value) as an input and outputs a value Mc_tar. Although the amount of exhaust energy immediately changes when the amount of cylinder air changes, the change of the turbo rotating speed lags behind the change of the amount of exhaust energy. The first-order lag element A is intended to accommodate for the lag.

The section B of the compressor model first uses the steady GA-Pic map to calculate the value Pic_tar of the supercharging pressure for the value Mc_tar on the steady GA-Pic map. Then, the difference between the calculated value Pic_tar and the supercharging pressure Pic (previous value) is multiplied by a gain G1. The section B is intended to calculate a correction value for correcting a flow rate shift from the steady GA-Pic map.

The section C of the compressor model multiplies the difference between the compressor upstream pressure Pa and the supercharging pressure Pic (previous value) by a gain G2. In a region where the supercharging pressure Pic (that is, the compressor downstream pressure) is lower than the compressor upstream pressure Pa, the compressor flow rate Mcp abruptly increases. The section C is intended to calculate a correction value for accommodating for such an abrupt increase of the compressor flow rate Mcp in the region where Pic<Pa.

The compressor model adds the correction values calculated in the sections B and C to the value Mc_tar described above to calculate the compressor flow rate Mcp. In FIG. 7, the arrow A indicates the processing by the first-order lag element A, and the arrow B indicates the processing by the section B.

According to prior art, the steady GA-Pic map shows a single line, that is, a one-to-one relationship. However, even if the intake flow rate GA is fixed, the magnitude of the exhaust energy may actually vary, and as a result, the supercharging pressure Pic may vary. This is probably because, in the steady operation state, the one-to-one relationship is actually established between the supercharging pressure Pic and the turbo rotating speed, and the turbo rotating speed varies with the magnitude of the exhaust energy even if the intake flow rate GA is fixed.

In addition, if the magnitude of the exhaust energy varies, the rate of increase or decrease of the turbo rotating speed also varies, so that the optimal value of the time constant T for the first-order lag element A also varies.

If blow-by of fresh air into the exhaust side occurs, the amount of fresh air used for combustion in the cylinders decreases by the amount of the blow-by fresh air. Therefore, compared with the case where blow-by does not occur, the exhaust energy decreases, so that the turbo rotating speed decreases. Therefore, for the same intake flow rate GA, the supercharging pressure Pic decreases in the case where blow-by of fresh air into the exhaust side occurs compared with the case where blow-by does not occur. In addition, as a result of the decrease of the exhaust energy, the rate of increase of the turbo rotating speed decreases, and the rate of decrease of the turbo rotating speed increases. If blow-by of fresh air into the exhaust side occurs, these effects can lead to inaccurate estimation of the compressor flow rate Mcp based on the compressor model.

According to this embodiment, in order to appropriately reflect these effects in the compressor model, the steady GA-Pic map and the time constant T for the first-order lag element A are corrected according to the blow-by amount Mex.

Figure 8:
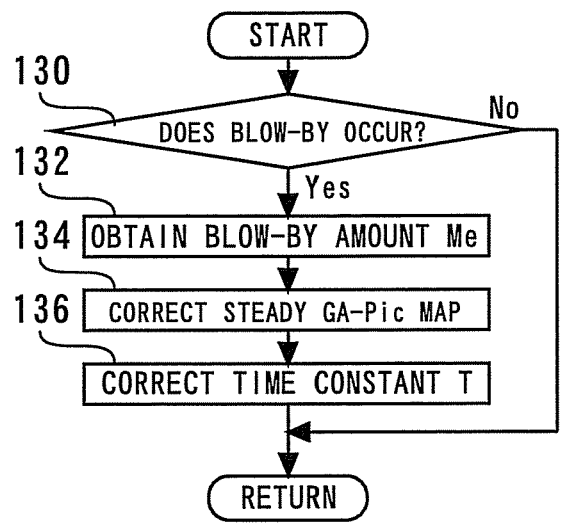
FIG. 8 is a flowchart illustrating a routine that is executed by the fourth embodiment of the present invention.

FIG. 8 is a flowchart showing a routine performed by the ECU 60 to serve the function described above according to this embodiment. According to the routine shown in FIG. 8, first, the presence or absence of blow-by of fresh air is determined (step 130). In step 130, the presence or absence of blow-by of fresh air is determined by performing substantially the same processings as those in steps 100 to 108 shown in FIG. 3 described above. However, this embodiment differs from the embodiment 1 in that the presence or absence of blow-by is determined by comparing the intake pipe pressure Pm estimated using the air model described above with the reference intake pipe pressure Pm_t. According to this embodiment, since the air model is used to estimate the intake pipe pressure Pm, the intake pipe pressure sensor 64 is not needed, so that the cost can be reduced.

If it is determined in step 130 that blow-by occurs, the blow-by amount Mex is calculated (step 132). In step 132, the blow-by amount Mex can be calculated in the same manner as in step 110 shown in FIG. 3 described above. Then, the steady GA-Pic map is corrected so that the supercharging pressure Pic decreases in the steady GA-Pic map (step 134). For example, the steady GA-Pic map is corrected to a curve D in FIG. 7. The correction amount in step 134 increases as the blow-by amount Mex calculated in step 132 increases.

Following the processing in step 134, the time constant T for the first-order lag element A is corrected (step 136). As described above, as the exhaust energy decreases, the rate of increase of the turbo rotating speed decreases, and the rate of decrease of the turbo rotating speed increases. Therefore, in step 136, the time constant T for the first-order lag element A is corrected in such a manner that the time constant T increases when the internal combustion engine 10 accelerates and the turbo rotating speed increases, and is corrected in such a manner that the time constant T decreases when the internal combustion engine 10 decelerates and the turbo rotating speed decreases. The correction amount increases as the blow-by amount Mex calculated in step 132 increases.

According to the routine shown in FIG. 8 described above, the effect of the decrease of the exhaust energy caused by blow-by of fresh air can be appropriately reflected in the compressor model. Therefore, even if blow-by of fresh air occurs, the compressor flow rate Mcp can be accurately estimated, and therefore, the intake pipe pressure Pm can be accurately estimated.

In the embodiment 4 described above, the time constant T corresponds to the "time constant" according to the eighth and ninth aspects of the present invention described earlier, the steady GA-Pic map corresponds to the "map" according to the eighth and ninth aspects of the present invention, and the blow-by amount Mex corresponds the "parameter" according to the eighth and ninth aspects of the present invention. In addition, the ECU 60 calculates the compressor flow rate Mcp based on the compressor model described above to implement the "compressor flow rate estimating means" according to the eighth aspect of the present invention, performs the processing in step 132 to implement the "blow-by amount calculating means" according to the ninth aspect of the present invention, performs the processings in step 134 and 136 to implement the "compressor model correcting means" according to the eighth and ninth aspects of the present invention.

Embodiment 5

Next, an embodiment 5 of the present invention will be described with reference to FIG. 9. However, the following description will be primarily focused on differences from the embodiment 4 described above, and descriptions of similar matters will be simplified or omitted.

As described earlier, the internal combustion engine 10 according to this embodiment can perform internal EGR by changing the intake valve timing InVT and the exhaust valve timing ExVT.

As described above with regard to the embodiment 4, it is desirable to make a correction according to the magnitude of the exhaust energy in order to improve the accuracy of estimation of the compressor flow rate Mcp based on the compressor model. Parameters that affect the magnitude of the exhaust energy include the EGR amount (the amount of recirculation of exhaust gas) in addition to the fresh air blow-by amount Mex. Even if the intake flow rate GA is fixed, the exhaust energy decreases as the EGR amount increases. This is because, as the EGR amount increases, the amount of inert gas in the cylinders increases, and therefore, the combustion temperature decreases. Thus, according to this embodiment, in order to appropriately reflect the effect of EGR in the compressor model, the steady GA-Pic map and the time constant T for the first-order lag element A are corrected according to the EGR amount.

Figure 9:
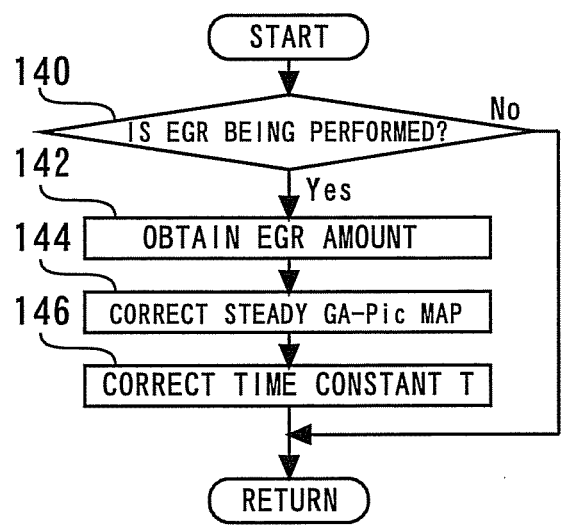
FIG. 9 is a flowchart illustrating a routine that is executed by a fifth embodiment of the present invention.

FIG. 9 is a flowchart showing a routine performed by the ECU 60 to serve the function described above according to this embodiment. According to the routine shown in FIG. 9, first, it is determined whether or not EGR is being performed (step 140). If the internal combustion engine has an external EGR apparatus (not shown), it is determined in step 140 that EGR is being performed if at least one of external EGR and internal EGR is being performed.

If it is determined in step 140 that EGR is being performed, the EGR amount is obtained (step 142). In the case where the internal combustion engine has the external EGR apparatus, the EGR amount obtained in step 142 includes not only the internal EGR amount but also the external EGR amount. The method of calculating the EGR amount is known and therefore will not be described herein.

Following the processing in step 142, the steady GA-Pic map is corrected so that the supercharging pressure Pic decreases in the steady GA-Pic map (step 144). For example, the steady GA-Pic map is corrected to the curve D in FIG. 7. The correction amount in step 144 increases as the EGR amount calculated in step 142 increases.

Following the processing in step 144, the time constant T for the first-order lag element A is corrected (step 146). According to this embodiment, in step 146, the time constant T for the first-order lag element A is corrected in such a manner that the time constant T increases when the internal combustion engine 10 accelerates and the turbo rotating speed increases, and is corrected in such a manner that the time constant T decreases when the internal combustion engine 10 decelerates and the turbo rotating speed decreases. The correction amount increases as the EGR amount obtained in step 142 increases.

According to the routine shown in FIG. 9 described above, the effect of the decrease of the exhaust energy caused by EGR can be appropriately reflected in the compressor model. Therefore, even during EGR, the compressor flow rate Mcp can be accurately estimated, and therefore, the intake pipe pressure Pm can be accurately estimated.

In the embodiment 5 described above, the intake variable valve apparatus 44 and the exhaust variable valve apparatus 46 that enable internal EGR correspond to the "exhaust gas recirculating means" according to the tenth aspect of the present invention described earlier, and the EGR amount corresponds to the "parameter" according to the tenth aspect of the present invention. In addition, the ECU 60 performs the processing in step 142 to implement the "exhaust gas recirculation amount obtaining means" according to the tenth aspect of the present invention and performs the processings in step 144 and 146 to implement the "compressor model correcting means" according to the tenth aspect of the present invention.

Embodiment 6

Next, an embodiment 6 of the present invention will be described with reference to FIG. 10. However, the following description will be primarily focused on differences from the embodiment 4 described above, and descriptions of similar matters will be simplified or omitted.

As described above with regard to the embodiment 4, it is desirable to make a correction according to the magnitude of the exhaust energy in order to improve the accuracy of estimation of the compressor flow rate Mcp based on the compressor model. The exhaust valve timing ExVT is a parameter that affects the magnitude of the exhaust energy. This is because, as the timing of opening of the exhaust valve 16 is delayed, the exhaust energy decreases, whereas the amount of work done by the combustion gas in the cylinders on the piston 12 increases. Thus, according to this embodiment, in order to appropriately reflect the effect of a delay of the timing of opening of the exhaust valve 16 in the compressor model, the steady GA-Pic map and the time constant T for the first-order lag element A are corrected according to the timing delay of the exhaust valve timing ExVT.

Figure 10:
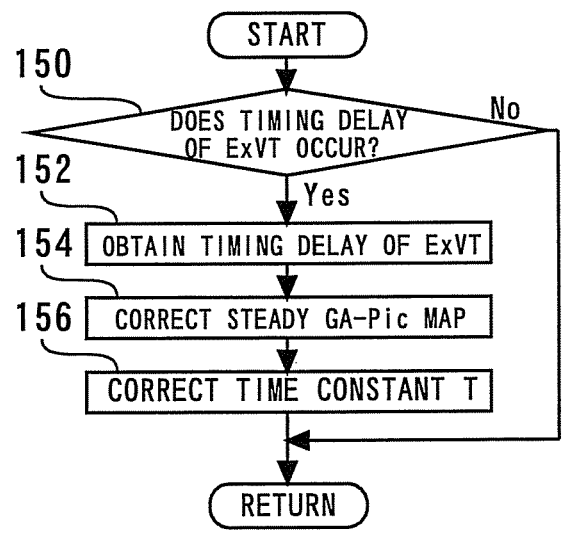
FIG. 10 is a flowchart illustrating a routine that is executed by a sixth embodiment of the present invention.

FIG. 10 is a flowchart showing a routine performed by the ECU 60 to serve the function described above according to this embodiment. According to the routine shown in FIG. 10, first, it is determined whether or not the exhaust valve timing ExVT is delayed (step 150). If it is determined in step 150 that the exhaust valve timing ExVT is delayed, the timing delay of the exhaust valve timing ExVT is obtained (step 152). Then, the steady GA-Pic map is corrected so that the supercharging pressure Pic decreases in the steady GA-Pic map (step 154). For example, the steady GA-Pic map is corrected to a curve D in FIG. 7. The correction amount in step 154 increases as the timing delay of the exhaust valve timing ExVT obtained in step 152 increases.

Following the processing in step 154, the time constant T for the first-order lag element A is corrected (step 156). In step 156, the time constant T for the first-order lag element A is corrected in such a manner that the time constant T increases when the internal combustion engine 10 accelerates and the turbo rotating speed increases, and is corrected in such a manner that the time constant T decreases when the internal combustion engine 10 decelerates and the turbo rotating speed decreases. The correction amount increases as the timing delay of the exhaust valve timing ExVT calculated in step 152 increases.

According to the routine shown in FIG. 10 described above, the effect of a decrease of the exhaust energy because of a timing delay of the exhaust valve timing ExVT can be appropriately reflected in the compressor model. Therefore, even if the exhaust valve timing ExVT is delayed, the compressor flow rate Mcp can be accurately estimated, and therefore, the intake pipe pressure Pm can be accurately estimated.

In the embodiment 6 described above, the timing delay of the exhaust valve timing ExVT corresponds to the "parameter" according to the eleventh aspect of the present invention described earlier. In addition, the ECU 60 performs the processings in step 154 and 156 to implement the "compressor model correcting means" according to the eleventh aspect of the present invention.

Embodiment 7

Next, an embodiment 7 of the present invention will be described with reference to FIG. 11. However, the following description will be primarily focused on differences from the embodiment 4 described above, and descriptions of similar matters will be simplified or omitted.

During transient operation, the ECU 60 performs an ignition timing delaying control that delays the ignition timing from a normal ignition timing in order to prevent knocking. The timing delay of the ignition timing with respect to the normal ignition timing in the case where the ignition timing delaying control is performed is referred to as an ignition timing delay hereinafter.

As described above with regard to the embodiment 4, it is desirable to make a correction according to the magnitude of the exhaust energy in order to improve the accuracy of estimation of the compressor flow rate Mcp based on the compressor model. The ignition timing delay is a parameter that affects the magnitude of the exhaust energy. This is because, as the ignition timing delay increases, the exhaust gas temperature rises, and the exhaust energy increases. As the exhaust energy increases because of the ignition timing delay, the rate of increase of the turbo rotating speed increases, and the rate of decrease of the turbo rotating speed decreases. Thus, according to this embodiment, in order to appropriately reflect the effect of an ignition timing delay in the compressor model, the time constant T for the first-order lag element A is corrected according to the ignition timing delay. The steady GA-Pic map does not have to be corrected because the ignition timing delaying control according to this embodiment is performed only during transient operation.

Figure 11:
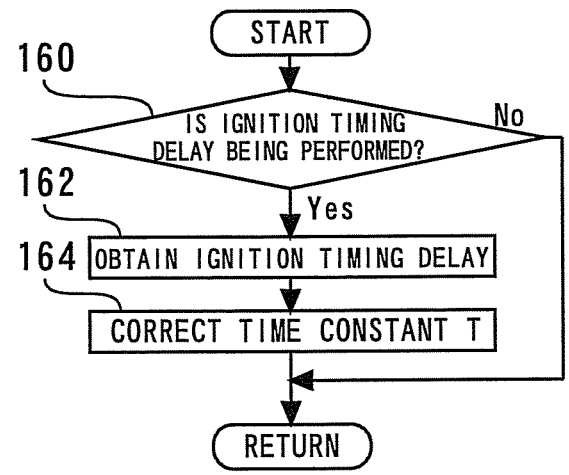
FIG. 11 is a flowchart illustrating a routine that is executed by a seventh embodiment of the present invention.

FIG. 11 is a flowchart showing a routine performed by the ECU 60 to serve the function described above according to this embodiment. According to the routine shown in FIG. 11, first, it is determined whether or not the ignition timing delay-ing control is being performed (step 160). If it is determined in step 160 that the ignition timing delaying control is being performed, the ignition timing delay is obtained (step 162). Then, the time constant T for the first-order lag element A is corrected (step 164). In step 164, the time constant T for the first-order lag element A is corrected in such a manner that the time constant T decreases when the internal combustion engine 10 accelerates and the turbo rotating speed increases, and is corrected in such a manner that the time constant T increases when the internal combustion engine 10 decelerates and the turbo rotating speed decreases. The correction amount increases as the ignition timing delay calculated in step 162 increases.

According to the routine shown in FIG. 11 described above, the effect of an increase of the exhaust energy because of an ignition timing delay can be appropriately reflected in the compressor model. Therefore, even during the ignition timing delaying control, the compressor flow rate Mcp can be accurately estimated, and therefore, the intake pipe pressure Pm can be accurately estimated.

In the embodiment 7 described above, the ignition timing delay corresponds to the "parameter" according to the eleventh aspect of the present invention described earlier. In addition, the ECU 60 performs the processing in step 162 to implement the "ignition timing delay obtaining means" according to the eleventh aspect of the present invention and performs the processing in step 164 to implement the "compressor model correcting means" according to the eleventh aspect of the present invention.

10 internal combustion engine
12 piston
14 intake valve
16 exhaust valve
18 ignition plug
20 cylinder injector
22 intake path
24 exhaust path
26 turbo supercharger
26a compressor
26b turbine
30 air flow meter
32 inter cooler
34 throttle valve
36 surge tank
42 NOx storage reduction three-way catalyst
44 intake variable valve apparatus
46 exhaust variable valve apparatus
48, 50 cam position sensor
60 ECU

The invention claimed is:

1. A control apparatus for an internal combustion engine, comprising:
a supercharger that has a compressor that compresses air in an intake path;
intake pipe pressure obtaining means that detects or estimates an intake pipe pressure;
an intake variable valve apparatus capable of changing a valve timing of an intake valve;
an exhaust variable valve apparatus capable of changing length of a valve overlap period in which both said intake valve and an exhaust valve are open without changing the valve timing of said intake valve;
storing means that stores information about a reference intake pipe pressure that is an intake pipe pressure on a boundary between a region where the amount of fresh air flowing in through said intake valve decreases when the valve timing of said intake valve is fixed and the length of the valve overlap period increases and a region where the amount of fresh air flowing in through said intake valve increases when the valve timing of said intake valve is fixed and the length of the valve overlap period increases;

reference intake pipe pressure obtaining means that obtains the reference intake pipe pressure for the valve timing of said intake valve based on the information stored in said storing means; and blow-by determining means that determines the presence or absence of blow-by of fresh air into an exhaust side based on a result of comparison between the intake pipe pressure detected or estimated by said intake pipe pressure obtaining means and the reference intake pipe pressure obtained by said reference intake pipe pressure obtaining means.

2. The control apparatus for an internal combustion engine according to claim 1, further comprising:

blow-by amount calculating means that calculates the amount of fresh air blowing by into the exhaust side based the intake pipe pressure detected or estimated by said intake pipe pressure obtaining means in a case where said blow-by determining means determines that blow-by occurs.

3. The control apparatus for an internal combustion engine according to claim 1, further comprising:

a fuel injection device;

cylinder fresh air amount calculating means that calculates the amount of fresh air charged to a cylinder based on the intake pipe pressure detected or estimated by said intake pipe pressure obtaining means in a case where said blow-by determining means determines that blow-by occurs;

first injection fuel amount calculating means that calculates an injection fuel amount based on a cylinder fresh air amount calculated by said cylinder fresh air amount calculating means and a target air-fuel ratio; and injection controlling means that makes said fuel injection device inject the amount of fuel calculated by said first injection fuel amount calculating means after said exhaust valve is closed in the case where said blow-by determining means determines that blow-by occurs.

4. The control apparatus for an internal combustion engine according to claim 3, wherein said fuel injection device includes a cylinder fuel injection device that injects fuel directly into the cylinder, and said injection controlling means makes said cylinder fuel injection device inject the amount of fuel calculated by said first injection fuel amount calculating means in the case where said blow-by determining means determines that blow-by occurs.

5. The control apparatus for an internal combustion engine according to claim 3, further comprising:

flow-in fresh air amount calculating means that calculates the amount of fresh air flowing in through said intake valve; and second injection fuel amount calculating means that calculates the injection fuel amount based on a flow-in fresh air amount calculated by said flow-in fresh air amount calculating means and the target air-fuel ratio, wherein said injection controlling means makes said fuel injection device inject the amount of fuel calculated by said second injection fuel amount calculating means in the case where said blow-by determining means determines that blow-by does not occur.

6. The control apparatus for an internal combustion engine according to claim 5, further comprising:

rich spike controlling means that performs a rich spike control to temporarily make the air-fuel ratio of exhaust gas richer as required, wherein said injection controlling means makes said fuel injection device inject the amount of fuel calculated by said second injection fuel amount calculating means regardless of the result of the determination by said blow-by determining means in a case where said rich spike controlling means performs the rich spike control.

7. The control apparatus for an internal combustion engine according to claim 1, wherein said supercharger drives said compressor with a turbine activated by a flow of exhaust gas, said control apparatus further comprises compressor flow rate estimating means that estimates the flow rate of fresh air passing through said compressor based on a compressor model including a time constant associated with a delay of a change of the rotating speed of said supercharger with respect to a change of an intake flow rate in a transient operation state and a map representing a relationship between an intake flow rate and a supercharging pressure in a steady operation state, and said compressor flow rate estimating means includes compressor model correcting means that corrects at least one of said time constant and said map based on a parameter that affects the magnitude of exhaust energy.

8. The control apparatus for an internal combustion engine according to claim 7, further comprising:

blow-by amount calculating means that calculates the amount of fresh air blowing by into the exhaust side based on the intake pipe pressure detected or estimated by said intake pipe pressure obtaining means in the case where said blow-by determining means determines that blow-by occurs, wherein said compressor model correcting means includes means that corrects said time constant and said map using a blow-by amount calculated by said blow-by amount calculating means as said parameter.

9. The control apparatus for an internal combustion engine according to claim 7, further comprising:

exhaust gas recirculating means that allows exhaust gas recirculation; and exhaust gas recirculation amount obtaining means that obtains an exhaust gas recirculation amount, wherein said compressor model correcting means includes means that corrects said time constant and said map using the exhaust gas recirculation amount obtained by said exhaust gas recirculation amount obtaining means as said parameter.

10. The control apparatus for an internal combustion engine according to claim 7, said compressor model correcting means includes means that corrects said time constant and said map using the valve timing of said exhaust valve as said parameter.

11. The control apparatus for an internal combustion engine according to claim 7, further comprising:

ignition timing delay obtaining means that obtains an ignition timing delay in a case where an actual ignition timing is delayed from a normal ignition timing, wherein said compressor model correcting means includes means that corrects said time constant using said ignition timing delay as said parameter.

12. A control apparatus for an internal combustion engine, comprising:

a supercharger that has a compressor that compresses air in an intake path;

an intake pipe pressure obtaining device that detects or estimates an intake pipe pressure;

an intake variable valve apparatus capable of changing a valve timing of an intake valve;

an exhaust variable valve apparatus capable of changing a length of a valve overlap period in which both said intake valve and an exhaust valve are open without changing the valve timing of said intake valve;

a storing device configured to store information about a reference intake pipe pressure that is an intake pipe pressure on a boundary between a region where the amount of fresh air flowing in through said intake valve decreases when the valve timing of said intake valve is fixed and the length of the valve overlap period increases and a region where the amount of fresh air flowing in through said intake valve increases when the valve timing of said intake valve is fixed and the length of the valve overlap period increases;

a reference intake pipe pressure obtaining device configured to obtain the reference intake pipe pressure for the valve timing of said intake valve based on the information stored in said storing device; and a blow-by determining device configured to determine the presence or absence of blow-by of fresh air into an exhaust side based on a result of comparison between the intake pipe pressure detected or estimated by said intake pipe.

13. The control apparatus for an internal combustion engine according to claim 12, further comprising:

a blow-by amount calculating device that calculates the amount of fresh air blowing by into the exhaust side based the intake pipe pressure detected or estimated by said intake pipe pressure obtaining device in a case where said blow-by determining device determines that blow-by occurs.

14. The control apparatus for an internal combustion engine according to claim 12, further comprising:

a fuel injection device;

a cylinder fresh air amount calculating device that calculates the amount of fresh air charged to a cylinder based on the intake pipe pressure detected or estimated by said intake pipe pressure obtaining device in a case where said blow-by determining device determines that blow-by occurs;

a first injection fuel amount calculating device that calculates an injection fuel amount based on a cylinder fresh air amount calculated by said cylinder fresh air amount calculating device and a target air-fuel ratio; and an injection controlling device that makes said fuel injection device inject the amount of fuel calculated by said first injection fuel amount calculating device after said exhaust valve is closed in the case where said blow-by determining device determines that blow-by occurs.

15. The control apparatus for an internal combustion engine according to claim 14, wherein said fuel injection device includes a cylinder fuel injection device that injects fuel directly into the cylinder, and said injection controlling device makes said cylinder fuel injection device inject the amount of fuel calculated by said first injection fuel amount calculating device in the case where said blow-by determining device determines that blow-by occurs.

16. The control apparatus for an internal combustion engine according to claim 14, further comprising:

a flow-in fresh air amount calculating device that calculates the amount of fresh air flowing in through said intake valve; and a second injection fuel amount calculating device that calculates the injection fuel amount based on a flow-in fresh air amount calculated by said flow-in fresh air amount calculating device and the target air-fuel ratio, wherein said injection controlling device makes said fuel injection device inject the amount of fuel calculated by said second injection fuel amount calculating device in the case where said blow-by determining device determines that blow-by does not occur.

17. The control apparatus for an internal combustion engine according to claim 16, further comprising:

a rich spike controlling device that performs a rich spike control to temporarily make the air-fuel ratio of exhaust gas richer as required, wherein said injection controlling device makes said fuel injection device inject the amount of fuel calculated by said second injection fuel amount calculating device regardless of the result of the determination by said blow-by determining device in a case where said rich spike controlling device performs the rich spike control.

18. The control apparatus for an internal combustion engine according to claim 12, wherein said supercharger drives said compressor with a turbine activated by a flow of exhaust gas, said control apparatus further comprises a compressor flow rate estimating device that estimates the flow rate of fresh air passing through said compressor based on a compressor model including a time constant associated with a delay of a change of the rotating speed of said supercharger with respect to a change of an intake flow rate in a transient operation state and a map representing a relationship between an intake flow rate and a supercharging pressure in a steady operation state, and said compressor flow rate estimating device includes a compressor model correcting device that corrects at least one of said time constant and said map based on a parameter that affects the magnitude of exhaust energy.

19. The control apparatus for an internal combustion engine according to claim 18, further comprising:

a blow-by amount calculating device that calculates the amount of fresh air blowing by into the exhaust side based on the intake pipe pressure detected or estimated by said intake pipe pressure obtaining device in the case where said blow-by determining device determines that blow-by occurs, wherein said compressor model correcting device includes a device that corrects said time constant and said map using a blow-by amount calculated by said blow-by amount calculating device as said parameter.

20. The control apparatus for an internal combustion engine according to claim 18 further comprising:

an exhaust gas recirculating device that allows exhaust gas recirculation; and an exhaust gas recirculation amount obtaining device that obtains an exhaust gas recirculation amount, wherein said compressor model correcting device includes device that corrects said time constant and said map using the exhaust gas recirculation amount obtained by said exhaust gas recirculation amount obtaining device as said parameter.

21. The control apparatus for an internal combustion engine according to claim 18, said compressor model correcting device includes a device that corrects said time constant and said map using the valve timing of said exhaust valve as said parameter.

22. The control apparatus for an internal combustion engine according to claim 18, further comprising:
- an ignition timing delay obtaining device that obtains an ignition timing delay in a case where an actual ignition timing is delayed from a normal ignition timing,
- wherein said compressor model correcting device includes a device that corrects said time constant using said ignition timing delay as said parameter.

* * * * *